United States Patent [19]

Thomson et al.

[11] Patent Number: 4,967,565
[45] Date of Patent: Nov. 6, 1990

[54] ECS WITH ADVANCED AIR CYCLE MACHINE

[75] Inventors: Mark W. Thomson, Ventura; Dan S. Matulich, Rolling Hills Estates; Terence P. Emerson, Hermosa Beach, all of Calif.

[73] Assignee: Allied-Signal Inc., Morris Township, Morris County, N.J.

[21] Appl. No.: 370,422

[22] Filed: Jun. 23, 1989

[51] Int. Cl.$^5$ ............................................. F25D 9/00
[52] U.S. Cl. ............................................. 62/87; 62/402
[58] Field of Search ................... 62/86, 87, 401, 402

[56] References Cited

U.S. PATENT DOCUMENTS

| | | | |
|---|---|---|---|
| 2,391,838 | 12/1945 | Kleinhans et al. | 62/402 |
| 2,409,159 | 10/1946 | Singleton | 62/402 X |
| 2,477,931 | 8/1949 | King | 62/87 X |
| 2,545,861 | 3/1951 | Sallou | 62/402 |
| 2,618,470 | 11/1952 | Brown et al. | 62/402 |
| 2,729,073 | 1/1956 | Nielsen et al. | 62/402 |
| 2,734,356 | 2/1956 | Kleinhans | 62/402 |
| 2,784,571 | 3/1957 | Schelp | 62/402 |
| 2,800,002 | 7/1957 | Seid | 62/402 |
| 2,916,890 | 12/1959 | Stein | 62/402 |
| 2,958,211 | 11/1960 | Griffith | 62/402 |
| 3,326,109 | 6/1967 | Markham | 62/402 X |
| 3,428,242 | 2/1969 | Rannenberg | 62/402 |
| 3,696,637 | 10/1972 | Ness et al. | 62/402 |
| 4,021,215 | 5/1977 | Rosenbush et al. | 62/402 |
| 4,265,397 | 5/1981 | Rannenberg | 62/402 X |
| 4,312,191 | 1/1982 | Biagini | 62/402 |
| 4,835,979 | 6/1989 | Murry et al. | 62/402 X |

FOREIGN PATENT DOCUMENTS 1106386  12/1954  France.

Primary Examiner—William E. Tapolcai
Attorney, Agent, or Firm—David B. Abel; Robert A. Walsh

[57] ABSTRACT

An advanced Environmental Control System (ECS) for use in conjunction with a turbine engine to provide conditioned, pressurized air to an enclosed space such as an aircraft cabin, as well as cooling capacity for the aircraft avionics. The ECS features a dual turbine air cycle machine to minimize the amount of bleed air or power required from the turbine engine.

23 Claims, 3 Drawing Sheets

ECS WITH ADVANCED AIR CYCLE MACHINE

BACKGROUND OF THE INVENTION

The present invention is directed to an Environmental Control System featuring an advanced semiclosed reverse Brayton air cycle loop with a unique air cycle machine. The air cycle machine includes dual turbines drivingly coupled to a compressor. Within the air cycle machine, one of the turbines is coupled to directly receive engine bleed air and extract useful work therefrom. The resulting Environmental Control system (ECS) minimizes the amount of bleed air required from the main engines, reducing the amount by up to 60 percent over present air cycle ECS systems.

Environmental Control Systems (ECS's) are in widespread use to provide a supply of conditioned air to an enclosed space, as for example an aircraft cabin and cockpit. Presently, the most efficient ECS's operate on a flow of bleed air taken from an intermediate or high pressure stage within a jet engine having multi-compression stages. The bleed air is first precooled within a primary heat exchanger, dumping heat to ram air, and is then ducted to a compressor. After compression, the air is routed through a series of heat exchangers and condensors, then expanded through a turbine before being ducted to the cabin. The turbine is mechanically linked to drive the compressor. These systems also incorporate various bypass lines, valves and controller means to regulate the temperature of the air delivered to the cabin.

Modern high performance aircraft also require cooling for aircraft avionics. This added cooling load may exceed the cooling load requirement of the cockpit and cabin. As a practical consideration, the avionics are preferably cooled by a liquid cooling cycle. Thus, various dual air-liquid cooling systems have been explored to provide the required cooling for the aircraft.

SUMMARY OF THE PRESENT INVENTION

The present invention utilizes a three wheel air cycle machine having two turbines driving one compressor all mounted upon a common shaft. The air cycle machine is incorporated within an Environmental Control System (ECS) which operates on a flow of compressed air bled from the high pressure stage of a multi-compressor turbine engine. The bleed air received from the high pressure stage of the engine is considerably hotter than bleed air taken from the intermediate stage. Accordingly, the energy available within the bleed air flow to power the ECS is greater, potentially allowing the system to use a reduced amount of bleed air to cool and pressurize the cabin as well as large avionics cooling loads. It is thus an object of the invention to provide an air cycle machine for an ECS which places a reduced bleed air load on the multistage engine.

To maximize the use of the energy of the high pressure bleed air flow, the air flow is first directed upon a high speed, high temperature turbine. Subsequently, the air flow is re-compressed by a high speed compressor which is driven by the first turbine. Following compression, wherein the air increases in temperature, the air flow is directed through the hot pass side of a primary heat exchanger. The cold pass side of the primary heat exchanger is exposed to a flow of ambient or ram air or other heat sink including on board fuel. The air flow may be directed through additional heat exchangers as well as a condensor and water extractor before being directed upon a second expansion turbine. The second expansion turbine is also drivingly coupled to the high speed compressor. Air exiting the second expansion turbine is super cooled and may require reheating prior to being ducted to the enclosed cabin space. A second object of the invention therefore is to provide an ECS system incorporating an advanced air cycle machine providing for higher thermal efficiency.

Further objects of the invention will become apparent to those skilled in the art upon consideration of the drawings when considered in connection with the description herein.

DETAILED DESCRIPTION OF THE PREFERRED EMBODIMENT

Figures 1, 2:
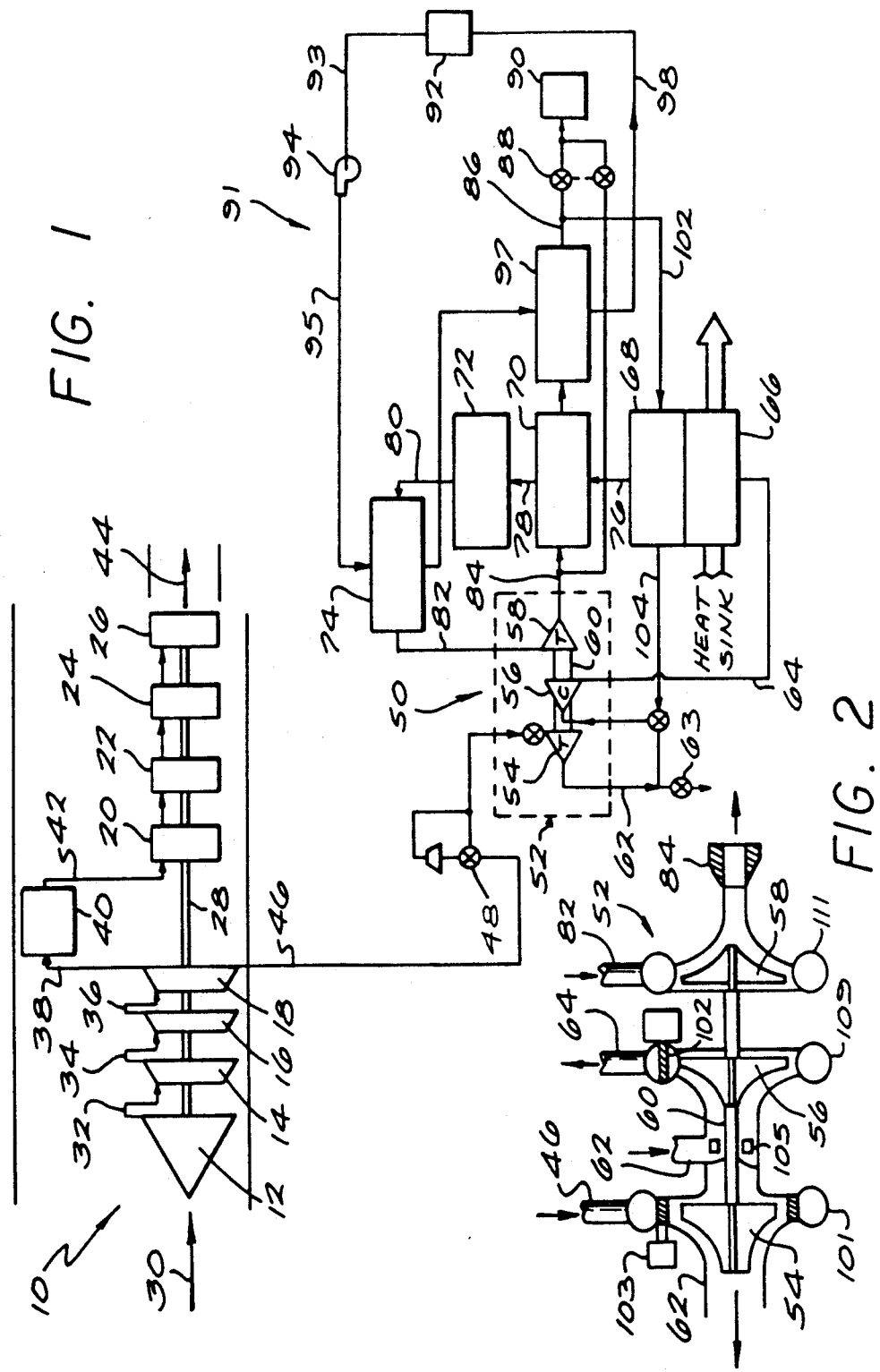
FIG. 1 schematically depicts a multi-stage engine and an environmental control system (ECS) according to the present invention for use therewith.
FIG. 2 schematically depicts in cross-sectional form an advanced dual turbine air cycle machine for use within the ECS of FIG. 1.

Referring to the drawings, FIG. 1 schematically depicts a multistage turbine engine 10 and an associated environmental control system (ECS) 50. The engine 10 includes first, second, third, and fourth compressor stages 12, 14, 16 and 18, as well as first, second, third and fourth turbine stages 20, 22, 24 and 26, all coupled by at least one shaft means 28.

During operation of the engine 10, ambient air 30 is inducted into first stage compressor 12, compressed, then discharged through a duct 32 and directed into the inlet of second stage compressor 14. Similarly ducts 34 and 36 distribute compressed discharge air from second and third stage compressors 14 and 16 respectively, to the inlets of third and fourth stage compressors 16 and 18 respectively. The discharge from fourth stage compressor 18 is routed by duct 38 to combustor 40, wherein the highly pressurized air is continuously combusted with fuel introduced to the combustor 40. Expanded combustion gases 42 exiting the combustor 30 are forced axially through the power turbines 20, 22, 24, and 26, to provide rotational power to the shaft means 28, before being exhausted from the engine 10 to the atmosphere through a discharge passage 44 positioned immediately downstream of turbine 26.

In addition, a bleed air line 46, which includes a flow control valve 48, receives a flow of high pressure, high temperature air from the fourth or highest available engine stage compressor 18, and conducts this bleed air flow to the ECS 50. Within the ECS 50, the bleed air flow is immediately conducted to an advanced air cycle machine 52, and specifically to a first turbine 54 therein. The first turbine 54 within the air cycle machine 52 is commonly mounted with a compressor 56 and second turbine 58, all of which are co-axially mounted upon a shaft 60. Thus, compressor 56 is driven by both first turbine 54 and second turbine 58.

The bleed air is first expanded through first turbine 54 which converts latent thermal energy to rotational output power. After expansion within the first turbine 54, the air flow is conducted via duct 62 to the inlet of compressor 56, wherein the air is recompressed. A pressure regulation valve 63, connected to duct 62, vents excess pressure to ambient. The air flow is then routed within duct 64 from compressor 56 to the hot pass side of primary heat exchanger 66, to be cooled by ram air ducted through the cold pass side of primary heat exchanger 66. Subsequently, the bleed air flow passes through a regenerative heat exchanger 68 wherein it is cooled with re-circulated conditioned bleed air, a condensor 70, wherein it is further cooled with supercooled bleed air to a temperature below the dew point. Entrained water is then removed from the bleed air flow within a water extractor 72. Next, the bleed air is reheated within a reheater 74 prior to being directed unto second expansion turbine 58. Ducts 76, 78, 80 and 82 conduct the air successively between regenerative heat exchanger 68, condensor 70, water extractor 72, reheater 74 and second turbine 58 respectively.

Within the second expansion turbine 58, the bleed air is expanded and super cooled, driving compressor 56. The super cooled air exiting turbine 58 is routed via duct 84 to the cold pass side of condensor 70, and is then subsequently conducted through duct 86 and flow control valve 88 to an enclosed space or cabin 90. The bleed air thereby provides a flow of conditioned, pressurized air to cool and pressurize the cabin 90.

In addition to the cooling requirements of cabin 90 which are satisfied by the conditioned bleed air flow, a liquid cycle subassembly 91 may be required to cool an avionics package 92. Within the liquid cycle subassembly 91, coolant is circulated from the avionics package 92 through coolant line 93, to coolant pump 94. The coolant pump 94 forces the coolant through a coolant line 95, the hot pass side of reheater 74, coolant line 96, the hot pass side of a liquid-air heat exchanger 97 and coolant line 98, which returns the coolant to the avionics package 92. Thereby the coolant fluid which is heated within the avionics package 92 is cooled within reheater 74 in heat exchange relationship with the bleed air immediately upstream of the second turbine 58. The content is further cooled within liquid-air heat exchanger 97, the cold pass side receiving super cooled air from downstream of the second turbine 58.

The air cycle system is a partially closed loop by virtue of recirculation ducts 102 and 104, which divert a portion of the conditioned air from duct 86, through regenerative heat exchanger 68, to mix with bleed air in duct 62 upstream of compressor 56. Regulating the air flow to cabin 90 via flow control valve 88 back pressurizes the air cycle machine 52, tending to stabilize the rotational speed thereof. Thus, adjusting the flow through valve 88 provides a simple method of maintaining an optimally efficient speed for the air cycle machine 52.

FIG. 2 schematically depicts the air cycle machine 52 of the ECS 50 of FIG. 1 in greater detail. The first turbine 54 is depicted as a radial inflow type turbine having a surrounding scroll or volute 101 which distributes the bleed air flow circumferentially about the first turbine 54. Bleed air flow into the first turbine 54 may be restricted and controlled by the use of a variable nozzle assembly 103. The bleed air exiting the first turbine 54 via duct 62 may be mixed with a variable flow of recirculated bleed air before being conducted via duct 62 to compressor 56. Flow directing vanes 105, 107 (FIG. 3) may additionally be incorporated both upstream and downstream respectively of the compressor, to recover the dynamic head of the pressurized air flow.

A volute 109 circumferentially mounted about compressor 56 receives the bleed air flow and provides an attachment for duct 64. Ultimately the bleed air flow reenters the air cycle machine 52 via duct 82 which is attached to turbine volute 111, thereby being distributed about and directed onto the second turbine 58.

Figure 3:
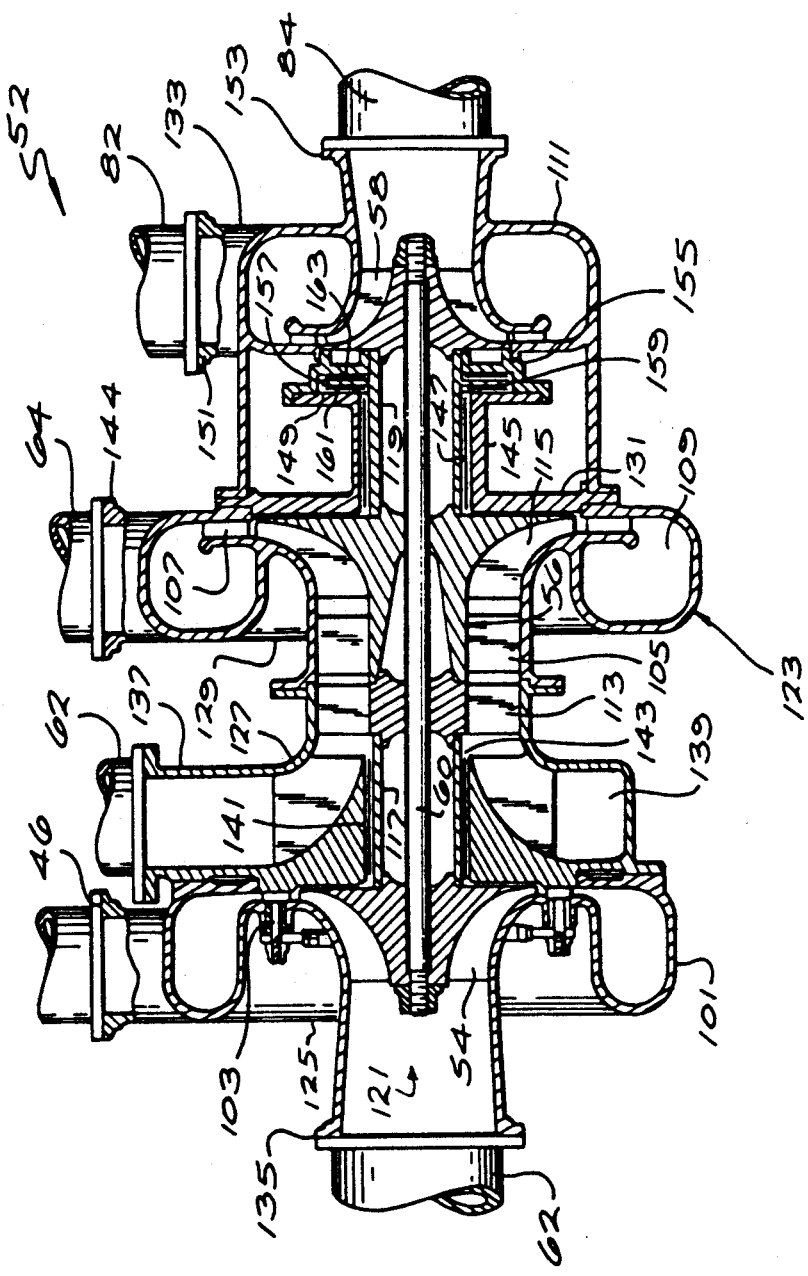
FIG. 3 is a detailed cross-sectional view of the air cycle machine of FIG. 1.

FIG. 3 shows a detailed cross sectional view of the air cycle machine 52 of Figs. 1 and 2. As depicted therein, the compressor 56 is preferably a two stage compressor having an axial stage 113 and a centrifugal stage 115. The shaft 60 is a tension shaft extending from the first turbine 54, through the axial and centrifugal stage compressors 113, 115, to the second turbine 58. In addition, a first bearing sleeve 117 separates and is compressed between the first turbine 54 and the axial compressor 113, while a second bearing sleeve 119 separates and is compressed between the centrifugal compressor 115 and the second turbine 58. Accordingly, a rotating assembly 121 for the air cycle machine 52 includes the first turbine 54, first bearing sleeve 117, axial compressor 113 centrifugal compressor 115, second bearing sleeve 119 and second turbine 58 all mounted upon tension shaft 60.

The rotating assembly 121 of the air cycle machine 52 is enclosed and supported within a housing assembly 123. The housing assembly 123 includes first, second, third, fourth and fifth housing sections 125, 127, 129, 131, 133 respectively. The first housing section 125 includes the first turbine volute 101 as well as a mounting flange 135 which accepts duct 62. The variable nozzle means 103 is additionally attached to and extends within a portion of the first housing section 123.

The second housing section 127 is mounted against the first housing section 125, surrounds the first bearing sleeve 117 and includes a flange 137 which accepts an opposite end of duct 62. The second housing section 127 also includes a plenum 139 into which bleed air from duct 62 is delivered for induction into the compressor 56. A cylindrical bearing race 141 within the second housing section 127 accommodates mounting of a journal bearing 143 about the first bearing sleeve 117 of the rotating assembly 121.

The third housing section 129 mounts adjacent to the second housing section 127 about the centrifugal compressor 115. The third housing section 129 includes compressor volute 109 for receiving compressed bleed air from the centrifugal compressor 115. The third housing section 129 also includes the radially inwardly extending stator vanes 105 immediately upstream of the centrifugal compressor 115, and the second set of stator vanes 107 immediately downstream of the centrifugal compressor 115. The third housing section 129 further includes a flange 144 which accepts duct 64 and communicates with compressor volute 109.

The fourth housing section 131 mounts against the third housing section 129 and surrounds the second bearing sleeve 119. The fourth housing section 131 includes an internal cylindrical bearing race 145 which accommodates mounting of a second journal bearing 147. Additionally, the fourth housing assembly 131 includes a disk shaped thrust bearing race 149 which extends radially outward from the internal cylindrical bearing race 145.

The fifth housing section 133 mounts against the fourth housing section 131 and about the second turbine 58. The fifth housing section 133 includes second turbine volute 111 surrounding second turbine 58 to distribute air thereto. In addition the fifth housing section 133 includes a first flange 151 which accommodates duct 82 and communicates with second turbine volute 111, as well as a second exhaust flange 153 downstream of the second turbine 58 which accepts duct 84.

The first, second, third, fourth, and fifth housing sections 125, 127, 129, 131, 133 are attached to adjacent housing sections by any conventional means such as for example bolts, rivets, or welds. Each of the housing sections 125, 127, 129, 131, and 133 are preferably formed by a casting, slip casting, or powder metallurgy process from high temperature high strength materials such as metallic alloys and advanced ceramics.

Enclosed within the housing assembly 123 and mounted between an internal portion of the fourth and fifth housing sections 131, 133 is a stepped disk shaped thrust bearing member 155. An outer diameter of the thrust bearing member 155 cooperatively mounts against thrust bearing race 149 to define a disk shaped cavity 157 therebetween. A thrust bearing disk 159, which extends radially outward from second bearing sleeve 119 of rotating assembly 121, is contained within cavity 157. A first thrust bearing means 161 is located within the cavity 157 between the thrust bearing race 149 and thrust bearing disk 159, and a second thrust bearing means 163 is located between thrust bearing disk 159 and a portion of thrust bearing member 155. By the interaction of the thrust bearing disk 159 and the thrust bearing means 161, 163, axial forces acting on the rotating assembly 121 are counteracted by the housing assembly 123.

Within the air cycle machine 52, the journal bearing 143, 147 as well as the thrust bearing means 161, 163 are preferably selected from the group including hydrodynamic, hydrostatic and hybrid hydrodynamic-hydrostatic thrust bearings of the type providing non-contact free running of the rotating assembly 121. Thus, while in operation, the rotating assembly 121 is radially and axially supported within the housing assembly 123 without physical contact therebetween.

It may be appreciated that the compact design of the rotating group for the air cycle machine 52, combined with the use of non-contacting bearings, increases the reliability and life of the air cycle machine 52 and the ECS 50. The design is especially adapted to use within high performance aircraft capable of high G maneuvers. High G forces acting on a rotating machine result in high torque moment loads transferred to the bearings. The reduced overall length of the rotating group of the air cycle machine 52 minimizes this high-G induced loading. Additionally, the non-contacting bearings of the present invention are sized to accommodate the G force induced loads without contacting the rotating assembly 121. Thus there is no wear on the bearing surfaces, and reliability of the machine is enhanced.

Figure 4:
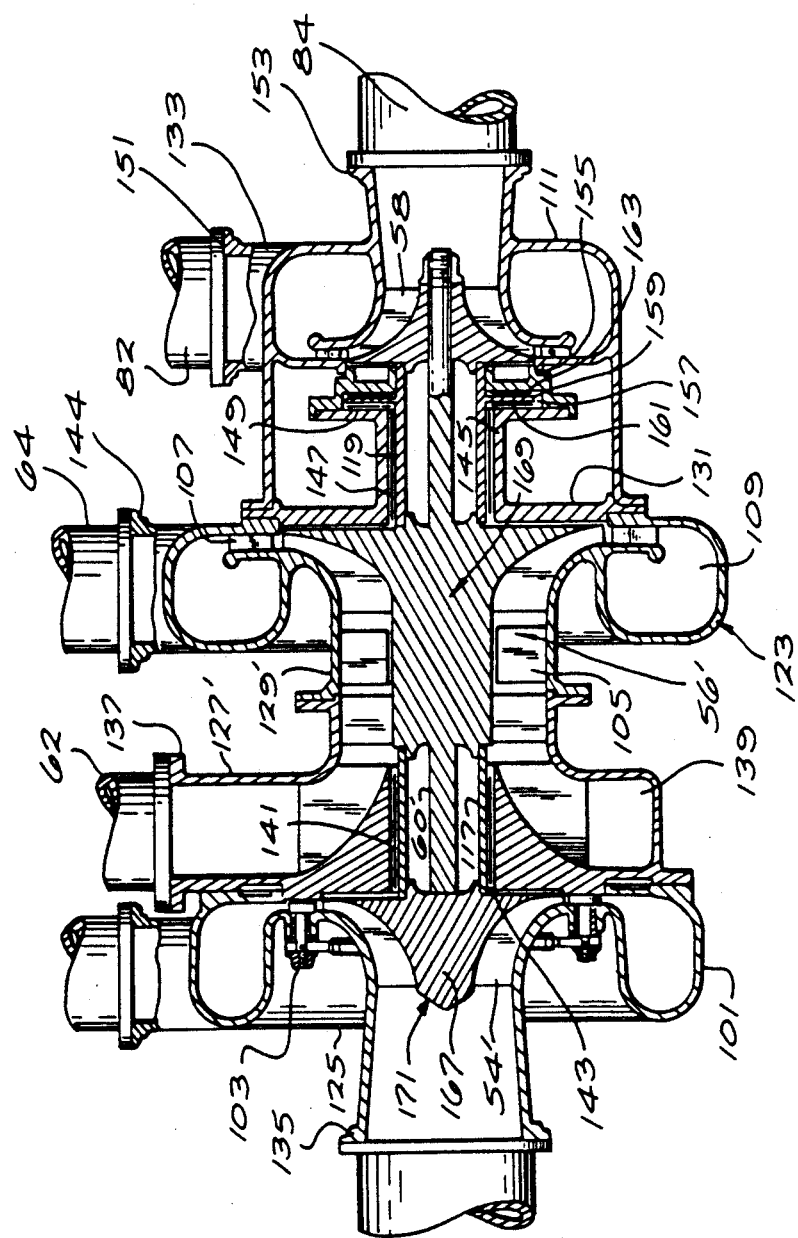
FIG. 4 is a detailed cross-sectional view of an alternative embodiment of an air cycle machine of FIG. 1.

FIG. 4 depicts an alternate embodiment of the air cycle machine of Figs. 1 and 2 wherein like elements have the same numbers assigned as in FIG. 3. The primary difference between the embodiment of FIG. 4 from that of FIG. 3 resides in the first turbine 54', compressor 56', shaft 60' and the second and third housing sections 127, 129. The first turbine 54' and the compressor 56' are both shown as having boreless hub sections 167, 169 respectively. Additionally, shaft 60' is formed integrally with compressor 56' and is attached to first turbine 54' preferably by a friction welding process, to form a unitary subassembly 171. In order to accommodate the unitary subassembly 171, the second and third housing sections 127', 129' are themselves split along an axial plane into two halves and assembled about the unitary subassembly 171. This arrangement allows higher operating speeds and temperatures by increasing the structural integrity of the turbine 54' and compressor 56'.

In order to illustrate the advantages of the ECS 50 of the present invention, Table 1 compares the ECS to a baseline ECS presently in use on the F15 aircraft. The Table summarizes the fuel weight in pounds required of each system due to three criteria, system weight, ram air flow, and bleed air flow. For a specific aircraft cruise mission segment, each of these factors will have an associated fuel consumption penalty factor. In this comparison, the weight penalty factor is 0.0646 pounds fuel per pound weight, the ram air penalty factor is 0.2835 pound fuel per pound ram air and the bleed penalty factor is 1.3104 pound fuel per pound bleed air. The systems are configured and compared for use on an F15 aircraft, flying at a speed of Mach 0.85, and an altitude of 45,000 feet. For the two systems, the advanced ECS of the present invention results in a reduction of approximately 67 pounds of fuel used within the cruise mission segment.

As may be appreciated upon review of Table 1, significant fuel savings result from decreasing the amount of bleed air taken from the engine, and to a lesser but significant extent by the reduction of the ram air and system weight for the ECS 50. Thus, the present invention provides significant savings in fuel consumption and weight by utilizing a reduced amount of high temperature bleed air, while maximizing the extraction of the useful work therefrom.

TABLE 1

| | Fuel Consumption (in pounds fuel) | | | |
|---|---|---|---|---|
| | Baseline ECS | Fuel lbs | Advanced ECS | Fuel lbs |
| weight (.0646) | 401 | 25.9 | 371 | 24.0 |
| ram air (.2835) | 150.6 | 42.7 | 67.7 | 19.2 |
| bleed air 1.3104 | 80.4 | 105.4 | 48.8 | 63.9 |
| Total Fuel | | 174.0 | | 107.1 |

From flight idle at low altitude to the high-Mach-number flights at 60,000 ft. the engine bleed air temperature and pressures change from 50 psi and 250° F. to in excess of 300 psi and 1200° F. the ram air temperature also can vary from −70° F. to over 400° F. An ECS design that depends on engine-compressed bleed air is always sensitive to the low-speed flight mode due to lower bleed air pressures. The ECS 50 is rendered somewhat immune to the bleed air pressure variations because shaft power can be sustained regardless by varying bleed air flow.

The first turbine 54 is designed to operate on high-pressure, high-temperature bleed air received directly from the selected engine compressor stage thus no precooler is required, so maximum energy can be extracted from the bleed air. Pressure regulation further downstream provides the variable pressure regulating characteristics needed for flow modulation, particularly when the bleed air pressure is high but the cooling capacity required is low. For normal power modulation, the first turbine 54 inlet nozzle area is varied to match required cooling capacity with available bleed air pressure. At low bleed air pressure the required air flow is higher, while at high bleed air pressure the required air flow is lower. The turbine power, reflecting a combination of inlet temperature, pressure ratio, and air flow, that must be matched to the heat load. The heat load, i.e. the cabin enclosure and avionics equipment, is pumped and rejected at heat-sink temperature level using aircraft fuel or ram air. Use of ram air as the heat sink makes the system particularly sensitive to an increase in aircraft speed because it raises the heat pumping requirement.

An additional advantage of the present invention may be appreciated when it is recognized that transient variations in the temperature and pressure of the bleed air are more readily accommodated by the turbine 54 then by a heat exchanger. The temperature of the bleed air taken from the high compression stage of a jet engine may vary from approximately 500° F. to over 1200° F., while the pressure may vary from about 100 psi to over 300 psi. Presently, turbines in use within jet engines operate at temperatures far in excess of 1200° F. Additionally, by the operation of the variable nozzles 103, the first turbine 54 can readily adapt to the variations in inlet temperature and pressure while maximizing the extraction of useful work.

By comparison, one of the most extreme environments for any heat exchanger is immediately downstream of the engine within a high performance aircraft. At this location, the temperature at the hot pass inlet manifold may vary as above from 500° F. to 1200° F. in a matter of seconds. For these conditions, the temperature at the outlet manifold of the hot pass would be about 100° F. to 500° F. respectively. Meanwhile, the cold pass side of the heat exchanger is exposed to ram air temperatures, which may range from 350° F. (at high Mach speeds) down to ambient temperatures. This combination of high temperature differences between the hot pass side inlet manifold and outlet manifold, and across the hot pass, cold pass barrier of the heat exchanger, results in significant thermal stressing, and rapid failure of the heat exchanger.

With the present invention, extreme temperatures of the bleed air have been moderated by the first turbine 54, recirculation air, and compressor 56 upstream of the primary heat exchanger 66. Thus the hot pass inlet manifold may be limited to maximum temperatures of about 1000° F. Additionally the present invention provides the potential for lengthening the time period for significant temperature changes at the inlet manifold thereby reducing thermal expansion stress. These beneficial changes result in significant increases in ECS reliability, while reducing the cost of the primary heat exchanger 66.

The invention thus provides a method of conditioning bleed air from a multistage turbine engine to provide cooling and pressurizing air for an enclosed space. The method includes the steps of first, extracting a flow of pressurized high temperature bleed air from the high pressure stage of said multistage turbine engine. Second, directly conducting the bleed air flow to a first turbine. Third, expanding the bleed air flow through the first turbine to convert latent thermal energy into rotational power. Fourth, regulating the pressure between the first turbine and a subsequent compressor by venting excess pressure through a pressure regulating valve. Fifth, conducting the expanded bleed air flow from the first turbine to the compressor. Sixth, re-pressurizing the bleed air within the compressor, the compressor rotationally driven by the first turbine. Seventh, cooling the re-pressurized bleed air within a primary heat exchanger downstream of the compressor in heat exchange relationship with a flow of ram air. Eighth, further cooling the re-pressurized, cooled bleed air upstream of a second turbine causing condensation of entrained water vapor and regeneratively heating super-cooled air downstream of the second turbine within a condensor having a cold flow path disposed within the duct between the second turbine and the enclosed space, and a hot flow path disposed intermediate the primary heat exchanger and the second turbine. Ninth, removing condensed water vapor from the bleed air within a water extractor positioned intermediate the condensor and the second turbine. Tenth, expanding the re-pressurized, cooled bleed air through the second turbine to convert energy of the bleed air to rotational power and to condition the bleed air, the second turbine located downstream of the primary heat exchanger and integrally mounted to drive the compressor. Finally, conducting the conditioned bleed air from the second turbine to the enclosed space. Additionally, the method may include recirculating a controlled portion of the conditioned bleed air to the compressor via a conduit in communication with the duct and the compressor. As well as, regeneratively heating the recirculated air within a regenerative heat exchanger having a hot flow path disposed between the primary heat exchanger and the condensor and a cold flow path disposed within the conduit, for further cooling the re-pressurized, cooled bleed air upstream of said expansion turbine. Other modifications to the method may include providing temperature control of the air delivered to the enclosure and regulating the flow of conditioned bleed air delivered to the enclosed space to back-pressurize the first and second turbines and the compressor and control the rotational speed thereof.

It should be evident from the foregoing description that the present invention provides many advantages over Environmental Control Systems and air cycle machines of the prior art. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. An environmental control system for conditioning air delivered to an enclosed space operated in conjunction with a multistage turbine engine providing power for the enclosed space, comprising:

bleed air means for extracting an air flow of pressurized high temperature bleed air from the high pressure stage of said multistage turbine engine;

first turbine means for directly receiving and converting latent thermal energy of said bleed air flow into rotational power;

compressor means for receiving said bleed air flow from said first turbine means and for re-pressurizing said bleed air, said compressor means rotationally driven by said first turbine means;

primary heat exchange means downstream of said compressor means for cooling said pressurized bleed air flow in heat exchange relationship with a flow of ram air;

second turbine means for converting energy of said bleed air flow to rotational power and for further conditioning said bleed air flow, said second turbine means located downstream of said heat exchange means and integrally mounted to drive said compressor means; and duct means communicating with said second turbine means and said enclosed space for carrying said air flow to said enclosed space.

2. The environmental control system of claim 1, further comprising:

condensor heat exchange means, having a cold flow path disposed within said duct means between said second turbine and said enclosed space and a hot flow path disposed intermediate said primary heat exchange means and said second turbine means, for further cooling said air flow upstream of said expansion turbine causing condensation of entrained water vapor, and for regeneratively heating super-cooled air downstream of said expansion turbine means.

3. The environmental control system of claim 2, further comprising:

water extractor means intermediate said condensor heat exchange means and said expansion turbine means for removing condensed water vapor from said air flow.

4. The environmental control system of claim 3, further comprising:

conduit means in communication with said duct means and said compressor means, for returning a controlled flow of air to said compressor means; and regenerative heat exchange means, having a hot flow path disposed between said primary heat exchange means and said condensor heat exchange means and a cold flow path disposed within said conduit means, for further cooling said air flow upstream of said expansion turbine.

5. The environmental control system of claim 4, further comprising:

valve means disposed within said conduit means for providing temperature control of said air delivered to said enclosure.

6. The environmental control system of claim 3, further comprising:

pressure regulating means disposed between said first turbine means and said compressor means for venting excess pressure.

7. The environmental control system of claim 1, further comprising:

closed loop liquid cycle means for providing liquid cooling to a heat source to cool said heat source.

8. The environmental control system of claim 7, wherein said closed loop liquid cycle means comprises:

heat exchange means for providing heat transfer between a cooling liquid and said conditioned air flow within said conduit means intermediate said second turbine and said enclosed space;

pump means for circulating said cooling fluid;

a first coolant line to deliver said coolant liquid from said pump means to said heat exchange means;

a second coolant line to deliver said coolant liquid from said heat exchange means to said heat source; and a third coolant line to return said coolant liquid from said heat source to said pump means.

9. The environmental control system of claim 8, wherein said closed loop liquid cycle means further comprises:

second heat exchange means having a liquid flow, cold pass side located intermediate said pump means and said heat exchange means along said first coolant line, and an air flow, hot pass side located intermediate said primary heat exchange means and said second turbine means, for allowing heat transfer between said cooling liquid and said cooled, pressurized bleed air upstream of said second turbine means.

10. The environmental control system of claim 7, wherein said enclosed space is an aircraft and said heat source includes said aircrafts electronic equipment.

11. The environmental control system of claim 1, further comprising:

condensor heat exchange means, having a cold flow path disposed within said duct means between said second turbine and said enclosed space and a hot flow path disposed intermediate said primary heat exchange means and said expansion turbine means, for further cooling said air flow upstream of said expansion turbine causing condensation of entrained water vapor, and for regeneratively heating super-cooled air downstream of said expansion turbine means;

water extractor means intermediate said condensor heat exchange means and said expansion turbine means for removing condensed water vapor from said air flow;

conduit means in communication with said duct means and said compressor means, for returning a controlled flow of air to said compressor means; and regenerative heat exchange means, having a hot flow path disposed between said primary heat exchange means and said condensor heat exchange means and a cold flow path disposed within said conduit means, for further cooling said air flow upstream of said expansion turbine;

valve means disposed within said conduit means for providing temperature control of said air delivered to said enclosure; and pressure regulating means disposed between said first turbine means and said compressor means for venting excess pressure.

12. The environmental control system of claim 11, further comprising:

closed loop liquid cycle means for providing liquid cooling to a heat source to cool said heat source.

13. The environmental control system of claim 12, wherein said closed loop liquid cycle means comprises:

heat exchange means for providing heat transfer between a cooling liquid and said conditioned air flow within said conduit means intermediate said second turbine and said enclosed space;

pump means for circulating said cooling fluid;

a first coolant line to deliver said coolant liquid from said pump means to said heat exchange means;

a second coolant line to deliver said coolant liquid from said heat exchange means to said heat source; and a third coolant line to return said coolant liquid from said heat source to said pump means.

14. The environmental control system of claim 13, wherein said closed loop liquid cycle means further comprises:

second heat exchange means having a liquid flow, cold pass side located intermediate said pump means and said heat exchange means along said first coolant line, and an air flow, hot pass side located intermediate said primary heat exchange means and said second turbine means, for allowing heat transfer between said cooling liquid and said cooled, pressurized bleed air upstream of said second turbine means.

15. The environmental control system of claim 12, wherein said enclosed space is an aircraft and said heat source includes said aircrafts electronic equipment.

16. A method of conditioning bleed air from a multi-stage turbine engine to provide cooling and pressurizing for an enclosed space, comprising:
    extracting a flow of pressurized high temperature bleed air from the high pressure stage of said multi-stage turbine engine;
    directly conducting said bleed air flow to a first turbine;
    expanding said bleed air flow through said first turbine to convert latent thermal energy into rotational power;
    conducting said expanded bleed air flow from said first turbine to a compressor;
    re-pressurizing said bleed air within said compressor, said compressor rotationally driven by said first turbine;
    cooling said re-pressurized bleed air within a primary heat exchanger downstream of said compressor in heat exchange relationship with a flow of ram air;
    expanding said re-pressurized, cooled bleed air through a second turbine to convert energy of said bleed air to rotational power and to condition said bleed air, said second turbine located downstream of said primary heat exchanger and integrally mounted to drive said compressor; and
    conducting said conditioned bleed air from said second turbine to said enclosed space.

17. The method claim 16, further comprising:
    cooling said re-pressurized, cooled bleed air upstream of said second turbine causing condensation of entrained water vapor and regeneratively heating super-cooled air downstream of said second turbine within a condensor having a cold flow path disposed within said duct means between said second turbine and said enclosed space, and a hot flow path disposed intermediate said primary heat exchanger and said second turbine.

18. The method claim 17, further comprising:
    removing condensed water vapor from said bleed air within a water extractor positioned intermediate said condensor and said second turbine.

19. The method of claim 18, further comprising:
    recirculating a controlled portion of said conditioned bleed air to said compressor via a conduit in communication with said duct and said compressor; and
    regeneratively heating said recirculated air within a regenerative heat exchanger having a hot flow path disposed between said primary heat exchanger and said condensor and a cold flow path disposed within said conduit, for further cooling said re-pressurized, cooled bleed air upstream of said expansion turbine.

20. The method of claim 19, further comprising:
    providing temperature control of said air delivered to said enclosure.

21. The method of claim 18, further comprising:
    regulating the pressure between said first turbine and said compressor by venting excess pressure through a pressure regulating valve.

22. The method of claim 19, further comprising:
    regulating the flow of conditioned bleed air delivered to said enclosed space to back-pressurize said first and second turbines and said compressor and control the rotational speed thereof.

23. The method claim 16, further comprising:
    cooling said re-pressurized, cooled bleed air upstream of said second turbine causing condensation of entrained water vapor and regeneratively heating super-cooled air downstream of said second turbine within a condensor having a cold flow path disposed within said duct means between said second turbine and said enclosed space, and a hot flow path disposed intermediate said primary heat exchanger and said second turbine;
    removing condensed water vapor from said bleed air within a water extractor positioned intermediate said condensor and said second turbine;
    recirculating a controlled portion of said conditioned bleed air to said compressor via a conduit in communication with said duct and said compressor; and
    regeneratively heating said recirculated air within a regenerative heat exchanger having a hot flow path disposed between said primary heat exchanger and said condensor and a cold flow path disposed within said conduit, for further cooling said re-pressurized, cooled bleed air upstream of said expansion turbine;
    providing temperature control of said air delivered to said enclosure; and
    regulating the flow of conditioned bleed air delivered to said enclosed space to back-pressurize said first and second turbines and said compressor and control the rotational speed thereof.

* * * * *